United States Patent
Kim et al.

(10) Patent No.: US 9,615,334 B2
(45) Date of Patent: Apr. 4, 2017

(54) COMMUNICATION POWER OPERATING METHOD AND ELECTRONIC DEVICE SUPPORTING THE SAME

(71) Applicant: Samsung Electronics Co., Ltd., Gyeonggi-do (KR)

(72) Inventors: Jung Hyung Kim, Gyeonggi-do (KR); Jung Joon Kim, Gyeonggi-do (KR); Ju Ho Van, Seoul (KR); Yu Seon Lee, Gyeongsangbuk-do (KR)

(73) Assignee: SAMSUNG ELECTRONICS CO., LTD, Suwon-si, Gyeonggi-Do (KR)

( * ) Notice: Subject to any disclaimer, the term of this patent is extended or adjusted under 35 U.S.C. 154(b) by 0 days.

(21) Appl. No.: 14/952,813

(22) Filed: Nov. 25, 2015

(65) Prior Publication Data

US 2016/0150483 A1 May 26, 2016

(30) Foreign Application Priority Data

Nov. 26, 2014 (KR) .................. 10-2014-0166732

(51) Int. Cl.
*H04W 52/24* (2009.01)
*H04B 17/354* (2015.01)

(52) U.S. Cl.
CPC ........ *H04W 52/243* (2013.01); *H04B 17/354* (2015.01)

(58) Field of Classification Search
CPC .... H04B 1/04; H04B 2001/045; H04B 15/00; H04B 17/00; H04B 17/354; H04W 52/234; H03F 1/26; H03F 1/0227; H03F 3/189; H03F 3/195
See application file for complete search history.

(56) References Cited

U.S. PATENT DOCUMENTS

| | | |
|---|---|---|
| 7,782,134 B2 | 8/2010 | Drogi et al. |
| 8,331,883 B2 | 12/2012 | Sorensen |
| 8,340,210 B2 | 12/2012 | Haddad |
| 8,583,062 B2 | 11/2013 | Donovan et al. |
| 8,736,376 B2 | 5/2014 | Kim et al. |
| 8,854,142 B2 | 10/2014 | Iizuka et al. |
| 8,913,973 B2 | 12/2014 | Donovan et al. |
| 2010/0060357 A1 | 3/2010 | Drogi et al. |
| 2010/0112967 A1 | 5/2010 | Sorensen |
| 2011/0256838 A1 | 10/2011 | Donovan et al. |
| 2011/0261896 A1 | 10/2011 | Haddad |
| 2012/0064849 A1* | 3/2012 | Langer .................. H04B 1/04 455/127.2 |

(Continued)

FOREIGN PATENT DOCUMENTS

| | | |
|---|---|---|
| KR | 10-2011-0063527 A | 6/2011 |
| KR | 10-2011-0089246 A | 8/2011 |

(Continued)

*Primary Examiner* — Thanh Le

(57) ABSTRACT

An electronic device includes a communication interface configured to establish a communication channel; and a controller configured to adjust an amplification current of a signal outputted through the communication channel corresponding to a measured Adjacent channel leakage ratio (ACLR) based on the communication channel, wherein the controller is configured to adjust a size of the amplification current corresponding to a difference between the measured ACLR and a specified condition.

18 Claims, 10 Drawing Sheets

(56) References Cited

U.S. PATENT DOCUMENTS

| | | | |
|---|---|---|---|
| 2012/0081178 A1* | 4/2012 | Shi | H03F 3/189 |
| | | | 330/149 |
| 2013/0072129 A1 | 3/2013 | Donovan et al. | |
| 2013/0076447 A1 | 3/2013 | Kim et al. | |
| 2013/0187711 A1* | 7/2013 | Goedken | H03F 1/0227 |
| | | | 330/149 |
| 2013/0195219 A1 | 8/2013 | Vinayagamoorthy et al. | |
| 2013/0321086 A1 | 12/2013 | Iizuka et al. | |
| 2015/0270806 A1* | 9/2015 | Wagh | H03F 1/0227 |
| | | | 330/296 |

FOREIGN PATENT DOCUMENTS

| | | |
|---|---|---|
| KR | 10-2013-0025894 A | 3/2013 |
| KR | 10-2013-0032525 A | 4/2013 |
| KR | 10-2013-0093513 A | 8/2013 |
| KR | 10-2013-0133528 A | 12/2013 |
| KR | 10-2014-0028274 A | 3/2014 |

* cited by examiner

COMMUNICATION POWER OPERATING METHOD AND ELECTRONIC DEVICE SUPPORTING THE SAME

CROSS-REFERENCE TO RELATED APPLICATION AND CLAIM OF PRIORITY

The present application is related to and claims priority from and benefit under 35 U.S.C. §119(a) of a Korean patent application filed on Nov. 26, 2014 in the Korean Intellectual Property Office and assigned Serial number 10-2014-0166732, the entire disclosure of which is hereby incorporated by reference.

TECHNICAL FIELD

The present disclosure relates generally to a communication power level adjustment of an electronic device.

BACKGROUND

An existing electronic device supports a communication service using a communication module. In relation to such communication service support, an electronic device can establish a communication channel with a base station by supplying a predetermined level of power to a communication module. In addition, a plurality of communication channels may be configured by a base station, however, each of the communication channels may have different operation power levels.

A conventional electronic device may set the highest level of power for a communication module in accordance with a specific communication method being used. Accordingly, the electronic device can consume a higher level of power even though the electronic device performs communications on a channel having an excellent condition that may provide a higher quality of communications at relatively lower level of power. Therefore, an efficient power consumption scheme for a communication module is needed to save undesirable power consumption and interference in a wireless communication system.

SUMMARY

To address the above-discussed deficiencies, it is a primary object to provide a communication power operating method for adjusting a power level that operates corresponding to characteristics of an allocated communication channel and an electronic device supporting the same.

In accordance with an aspect of the present disclosure, an electronic device includes: a communication interface configured to establish a communication channel; and a controller configured to adjust an amplification current of a signal outputted through the communication channel corresponding to a measured Adjacent channel leakage ratio (ACLR) based on the communication channel, wherein the controller may adjust a size (or amount) of the amplification current corresponding to a difference between the measured ACLR and a specified condition.

In accordance with another aspect of the present disclosure, a communication power operating method includes: establishing a communication channel; and when a measured Adjacent Channel Leakage Ratio (ACLR) in correspondence to the communication channel satisfies a specified condition, adjusting a size (or amount) of an amplification current.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
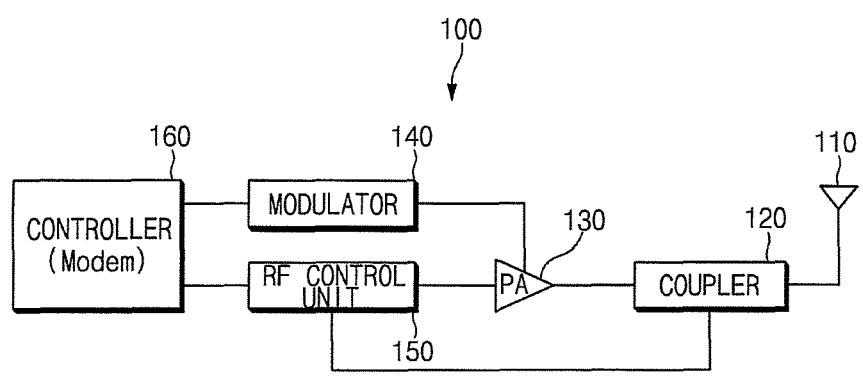
FIG. 1 illustrates an example block diagram of an electronic device according to various embodiments of the present disclosure.

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device. Hereinafter, various embodiments of the present disclosure are disclosed with reference to the accompanying drawings. However, this does not limit various embodiments of the present disclosure to a specific embodiment and it should be understood that the present disclosure covers all the modifications, equivalents, and/or alternatives of this disclosure provided they come within the scope of the appended claims and their equivalents. With respect to the descriptions of the drawings, like reference numerals refer to like elements.

The term "include," "comprise," and "have", or "may include," or "may comprise" and "may have" used herein indicates disclosed functions, operations, or existence of elements but does not exclude other functions, operations or elements.

For instance, the expression "A or B", or "at least one of A or/and B" may indicate include A, B, or both A and B. For instance, the expression "A or B", or "at least one of A or/and B" may indicate (1) at least one A, (2) at least one B, or (3) both at least one A and at least one B.

The terms such as "1st", "2nd", "first", "second", and the like used herein may refer to modifying various different elements of various embodiments of the present disclosure, but do not limit the elements. For instance, "a first user device" and "a second user device" may indicate different users regardless of the order or the importance. For example, a first component may be referred to as a second component and vice versa without departing from the scope of the present disclosure.

In various embodiments of the present disclosure, it will be understood that when a component (for example, a first component) is referred to as being "(operatively or communicatively) coupled with/to" or "connected to" another component (for example, a second component), the component may be directly connected to the other component or connected through another component (for example, a third component). In various embodiments of the present disclosure, it will be understood that when a component (for example, a first component) is referred to as being "directly connected to" or "directly access" another component (for example, a second component), another component (for example, a third component) does not exist between the component (for example, the first component) and the other component (for example, the second component).

The expression "configured to" used in various embodiments of the present disclosure may be interchangeably used with "suitable for", "having the capacity to", "designed to", "adapted to", "made to", or "capable of" according to a situation, for example. The term "configured to" may not necessarily mean "specifically designed to" in terms of hardware. Instead, the expression "a device configured to" in some situations may mean that the device and another device or part are "capable of". For example, "a processor configured to perform A, B, and C" in a phrase may mean a dedicated processor (for example, an embedded processor) for performing a corresponding operation or a generic-purpose processor (for example, a CPU or application processor) for performing corresponding operations by executing at least one software program stored in a memory device.

Terms used in various embodiments of the present disclosure are used to describe specific embodiments of the present disclosure, and are not intended to limit the scope of other embodiments. The terms of a singular form may include plural forms unless they have a clearly different meaning in the context. Otherwise indicated herein, all the terms used herein, which include technical or scientific terms, may have the same meaning that is generally understood by a person skilled in the art. In general, the terms defined in the dictionary should be considered to have the same meaning as the contextual meaning of the related art, and, unless clearly defined herein, should not be understood abnormally or as having an excessively formal meaning. In any cases, even the terms defined in this specification cannot be interpreted as excluding embodiments of the present disclosure.

According to various embodiments of the present disclosure, electronic devices may include at least one of smartphones, tablet personal computers (PCs), mobile phones, video phones, electronic book (e-book) readers, desktop personal computers (PCs), laptop personal computers (PCs), netbook computers, workstation server, personal digital assistants (PDAs), portable multimedia player (PMPs), MP3 players, mobile medical devices, cameras, and wearable devices (for example, smart glasses, head-mounted-devices (HMDs), electronic apparel, electronic bracelets, electronic necklaces, electronic appcessories, electronic tattoos, smart mirrors, and smart watches).

According to some embodiments of the present disclosure, an electronic device may be smart home appliances. The smart home appliances may include at least one of, for example, televisions, digital video disk (DVD) players, audios, refrigerators, air conditioners, cleaners, ovens, microwave ovens, washing machines, air cleaners, set-top boxes, home automation control panels, security control panels, TV boxes (e.g., SAMSUNG HOMESYNC™, APPLE TV™, GOOGLETV™ or the like), game consoles (for example, Xbox™ and PlayStation™), electronic dictionaries, electronic keys, camcorders, and electronic picture frames.

According to some embodiments of the present disclosure, an electronic device may include at least one of various medical devices supporting call forwarding service (for example, various portable measurement devices (for example, glucometers, heart rate meters, blood pressure meters, temperature meters, etc.), magnetic resonance angiography (MRA) devices, magnetic resonance imaging (MRI) devices, computed tomography (CT) devices, medical imaging devices, ultrasonic devices, etc.), navigation devices, global positioning system (GPS) receivers, event data recorders (EDRs), flight data recorders (FDRs), vehicle infotainment devices, marine electronic equipment (for example, marine navigation systems, gyro compasses, etc.), avionics, security equipment, vehicle head units, industrial or household robots, financial institutions' automatic teller's machines (ATMs), or stores' point of sales (POS) or internet of things (for example, bulbs, various sensors, electric or gas meters, sprinkler systems, fire alarms, thermostats, street lights, toasters, exercise equipment, hot water tanks, heaters, boilers, etc.).

In various embodiments of the present disclosure, an electronic device may include at least one of part of furniture or buildings/structures supporting call forwarding service, electronic boards, electronic signature receiving devices, projectors, and various measuring instruments (for example, water, electricity, gas, or radio signal measuring instruments). An electronic device according to various embodiments of the present disclosure may be one of the above-mentioned various devices or a combination thereof. Additionally, an electronic device according to an embodiment of the present disclosure may be a flexible electronic device. Additionally, an electronic device according to an embodiment of the present disclosure is not limited to the above-mentioned devices and may include a new kind of an electronic device according to the technology development.

Hereinafter, an electronic device according to various embodiments of the present disclosure will be described in more detail with reference to the accompanying drawings. The term "user" in this disclosure may refer to a person using an electronic device or a device using an electronic device (for example, an artificial intelligent electronic device).

FIG. 1 illustrates an example block diagram of an electronic device 100 according to various embodiments of the present disclosure.

As illustrated in FIG. 1, the electronic 100 comprises a controller 160, an RF controller 140, an amplifier 130 (such as a power amplifier), a coupler 120, and an antenna 110. Based on a power feedback outputted from the amplifier 130 by using the coupler 120, the electronic device 100 controls a signal transmission according to a specified size of power level.

The antenna 110 transmits signals in connection to the amplifier 130 or the coupler 120 connected to the amplifier 130. Additionally, the antenna 110 receives external signals in a state of supporting a reception function as being disposed not to be connected to the amplifier 130 (such as a transmission amplifier) or the coupler 120. As illustrated in FIG. 1, the antenna 110 is connected to a transmitter module. According to various embodiments of the present disclosure, the electronic device 100 includes a plurality of antennas and supports a multi-input multi-output (MIMO) function. Alternatively, according to various embodiments of the present disclosure, the electronic device 100 includes a plurality of communication modules and includes at least one antenna necessary for each communication module operation. According to an embodiment of the present disclosure, when supporting an LTE communication system, the electronic device 100 includes one antenna disposed for a transmission and two antennas disposed for a reception. As aforementioned, the electronic device 100 is not limited to a number or forms of antennas and includes at least one antenna 110. Additionally, the electronic device 100 is designed to operate a set of unique antennas in correspondence to a communication method. For example, in the case of supporting inter-carrier aggregation (CA) or intra-CA operation, various embodiments of the present disclosure are applied to the amplifier 130 disposed in each of a plurality of transmission side modules. Accordingly, the electronic device 100 individually reduces a current power consumption of amplifiers in relation to a CA operation.

The coupler 120 is disposed between the amplifier 130 and the antenna 110. The coupler 120 couples signals outputted from the amplifier 130 and provides the coupled signals in a feedback form to the RF controller 150. The coupler 120 performs the feedback of a coupling signal in real time or a predetermined period.

The amplifier 130 is disposed between the RF controller 150 and the coupler 120. Additionally, the amplifier 130 is disposed between the coupler 120 and the modulator 140. Accordingly, the amplifier 130 adjusts (such as amplify) signals provided from the RF controller 150 to correspond to signals provided from the modulator 140 and then, output the adjusted signals to the coupler 120. During this operation, an amplifier current (PA Icq) of the amplifier 130 is adjusted in correspondence to a control scheme of the modulator 140. The amplifier 130 amplifies signals outputted from the RF controller 150 based on the adjusted amplified current.

The modulator 140 is disposed between the controller 160 and the amplifier 130. The modulator 140, for example, is an envelope tracking (ET) modulator. The modulator 140 detects an envelope of a signal delivered to the RF controller 150. The modulator 140 checks a signal delay by using the detected envelope. When a signal delay occurs, the modulator 140 adjusts anon-matching between a main path of a signal outputted through the RF controller 150 and an envelope path of a signal delivered through the modulator 140 by adjusting a specified parameter. According to various embodiments of the present disclosure, the modulator 140 adjusts a current (or a bias current) of the amplifier 130 in correspondence to a control scheme of the controller 160. For example, the modulator 140 gradually adjusts a bias current of the amplifier 130 to a specified size or adaptively adjusts the bias current (such as adjust a current adjustment width to an uneven width) in correspondence to a control scheme of the controller 160.

For example, the modulator 140 gradually lowers a bias current of the amplifier 130 by a specified size in correspondence to a control scheme of the controller 160. Alternatively, the modulator 140 lowers a bias current of the amplifier 130 at once in correspondence to a control of the controller 160. Alternatively, after lowering a bias current of the amplifier 130 to a size (or an amount) close to a specified size in correspondence to a control scheme of the controller 160, the modulator 140 lowers the close size to a specified size at least one time by a relatively small size (such as a smaller size than the width lowered at a time) so that the modulator 140 adjusts a bias current of the amplifier 130 to be the specified size.

The RF controller 150 is disposed between the controller 160 and the amplifier 130. The RF controller 150 converts a specified signal into an analog signal in correspondence to a control scheme of the controller 160 and then, delivers the converted analog signal to the amplifier 130. For example, after containing a signal provided from the controller 160 in a specified frequency or up-converting a frequency containing data, the RF controller 150 delivers the signal to the amplifier 130.

According to various embodiments of the present disclosure, the RF controller 150 performs an amplitude (AM)/AM comparison of signals fed back from the coupler 120 to check the adjacent channel leakage ratio (ACLR) performance of the current channel. For example, the RF controller 150 compares an amplitude value of a signal outputted through the current channel and an amplitude value of a specified ACLR. The RF controller 150 delivers the detected deviation value (such as an amplitude deviation value) to the modulator 140.

The specified ACLR is specified statistically or experimentally. Alternatively, the specified ACLR is obtained experimentally by testing an entire channel with respect to a communication system and a communication module, that are applied when the electronic device 100 is manufactured. Alternatively, according to various embodiments of the present disclosure, the specified ACLR is changed according to an operation of the electronic device 100. For example, the specified ACLR is updated to the lowest ACLR during a process of operating the electronic device 100. According to various embodiments of the present disclosure, the RF controller 150 performs a role for only delivering a signal fed back from the coupler 120 to the controller 160.

The controller 160 delivers, processes, and stores signals relating to an operation of the electronic device 100. According to an embodiment of the present disclosure, the controller 160 is a modem. The controller 160 generates signals to be transmitted through the antenna 110 and decodes signals received by the antenna 110.

According to an embodiment of the present disclosure, the controller 160 receives a deviation value (such as an amplitude deviation value) between an ACLR performance value of a signal that is currently outputted from the RF controller 150 and a specified ACLR performance value and delivers the received deviation value to the modulator 140. The modulator 140 adjusts a bias current of the amplifier 130 based on the deviation value delivered by the controller 160.

According to various embodiments of the present disclosure, the RF controller 150 receives the feedback signal of a signal outputted from the amplifier 130, from the RF controller 150 or the coupler 120. Upon the receipt of a feedback signal, the controller 160 detects the ACLR performance value of the current channel by performing an AM/AM comparison. The controller 160 detects a difference between the detected ACLR and a specified ACLR, and delivers the detected difference to the modulator 140. Alternatively, the controller 160 delivers a difference value between an amplitude value of a specified ACLR and an amplitude value of a signal currently outputted from the amplifier 130 to the modulator 140.

As aforementioned, a specified ACLR (such as an amplitude value corresponding to a specified ACLR value) is stored in a memory such as ROM or in a given specific memory area. A specified ACLR is disposed in an area accessible by the RF controller 150 or the controller 160. According to various embodiments of the present disclosure, if a specified ACLR is designed to be adjustable, the specified ACLR is stored in an RAM or flash type memory, and is updated in correspondence to a control scheme of the controller 160 (or in correspondence to a control of the RF controller 150).

The controller 160 checks a feedback signal received from the RF controller 150 to check the non-matching between an envelope signal of the modulator 140 and a signal outputted from the RF controller 150. The controller 160 delivers a parameter adjustment request (or signal) for delay processing to the modulator 140 in order to allow the non-matching state of corresponding signals to be a matching state. According to an embodiment of the present disclosure, the controller 160 delivers a feedback signal that is obtained by mixing an output signal of the modulator 140 and an output signal of the RF controller 150 to the modulator 140 or detects a delay value to deliver the feedback signal to the modulator 140. The modulator 140 detects a delay value by analyzing the delivered feedback signal and adjusts a phase change of an envelope signal to be outputted based on the detected delay value. Alternatively, the modulator 140 performs processing to adjust a phase of an envelope signal based on the delay value provided from the controller 160 in order to match a signal to be outputted from the RF controller 150.

According to various embodiments of the present disclosure, the controller 160 detects a surrounding wireless environment state value. For example, the controller 160 detects a wireless signal reception sensitivity. The controller 160 may differently process the bias current size adjustment of the amplifier 130 in correspondence to the size of a reception sensitivity value of a wireless signal. For example, the controller 160 processes to greatly reduce the size of a bias current of the amplifier 130 in an environment having an excellent wireless signal reception sensitivity (such as a strong electric field environment). In relation to this, the controller 160 manages ACLRs to be applied to each electric field.

The electric field specific ACLRs, for example, includes a specified ACLR in a weak electric field situation, a specified ACLR in a general electric field situation, and ACLRs in a strong electric field situation. According to an embodiment of the present disclosure, the size of a specified ACLR in a weak electric field situation is smaller than the size of an ACLR in a strong electric field situation. For example, an ACLR in a weak electric field situation is 37 dBc and an ACLR in a strong electric field situation may be 34 dBc. Correspondingly, the controller processes to supply a greater bias current of the amplifier 130 in a weak electric field situation than a strong electric field situation. The aforementioned ACLR is designed to be greater than an ACLR that federal transit administration (FTA) defines or an ACLR that an electronic device manufacturer defines even in a strong electric field situation in a relatively excellent channel or in the most excellent channel.

As aforementioned, the electronic device 100 adjusts a bias current of the amplifier 130 in order to output an appropriate amplitude of signal in accordance with channel's unique characteristics in a frequency band defined by a communication method. Based on this, the electronic device 100 operates based on a bias current that corresponds to the characteristics of an actually applied channel regardless of voice mode or data mode. Accordingly, the electronic device 100 reduces unnecessary power consumption.

According to various embodiments of the present disclosure, an electronic device includes: a communication interface configured to establish a communication channel; and a controller configured to adjust an amplification current of a signal outputted through the communication channel according to a measured ACLR based on the communication channel, wherein the controller adjusts a size (or an amount) of the amplification current corresponding to a difference between the measured ACLR and a specified condition.

According to various embodiments of the present disclosure, the electronic device further includes: a modulator configured to adjust an envelope of a signal outputted from the controller and adjust the size of the amplification current in correspondence to a control of the controller; an amplifier configured to amplify a signal by using an adjusted current value outputted from the modulator; a coupler configured to couple the amplifier output; and a radio frequency (RF) controller configured to deliver a measured ACLR based on a coupled signal of the coupler to the controller and output a signal corresponding to a control of the controller to the amplifier.

According to various embodiments of the present disclosure, the RF controller supports a size (or an amount) adjustment of the amplification current based on a difference between the measured ACLR and a specified ACLR or a difference between an amplitude of the measured ACLR and an amplitude of the specified ACLR.

According to various embodiments of the present disclosure, the controller stores a minimum ACLR among the measured ACLRs as the specified ACLR.

According to various embodiments of the present disclosure, the controller stores a minimum ACLR among entire channels accessible through the communication interface as the specified ACLR.

According to various embodiments of the present disclosure, the controller perform a control to deliver an amplification current adjustment value corresponding to a difference between the measured ACLR and a specified ACLR or a difference between an amplitude of the measured ACLR and an amplitude of the specified ACLR, to the modulator.

According to various embodiments of the present disclosure, the controller processes an envelope delay when the measured ACLR is less than a specified ACLR.

According to various embodiments of the present disclosure, the controller obtains wireless environment information of the communication channel and adjusts the size of the amplification current in correspondence to a selected ACLR in correspondence to the obtained wireless environment information and the measured ACLR.

According to various embodiments of the present disclosure, the controller adjusts the size of the amplification current in correspondence to a difference between a measured ACLR obtained in correspondence to a changed communication channel as a base station establishing the communication channel is changed and a specified ACLR.

According to various embodiments of the present disclosure, when a communication method is changed, the controller measures an ACLR in correspondence to a channel allocated to the changed communication method and adjusts the size of the amplification current in correspondence to the measured ACLR and a specified ACLR.

Figure 2:
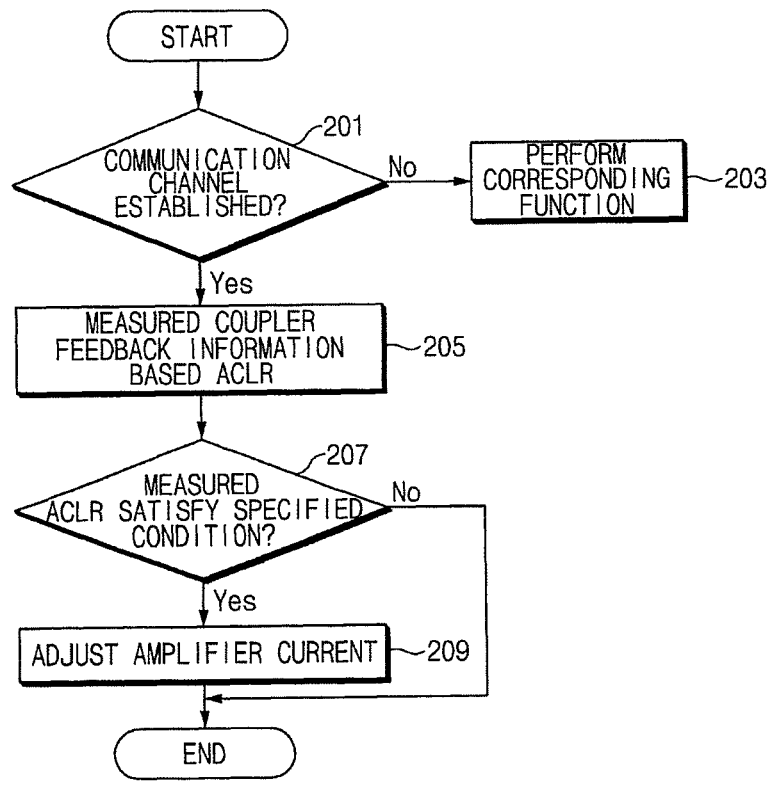
FIG. 2 illustrates an example operation method of an electronic device according to various embodiments of the present disclosure.

FIG. 2 illustrates an example operation method of an electronic device according to various embodiments of the present disclosure.

As illustrated in FIG. 2, the electronic device 100 checks whether an event relating to communication channel establishment occurs in operation 201. If the occurred event does not relate to communication channel establishment, the electronic device 100 performs a function corresponding to an event type in operation 203. For example, the electronic device 100 process a file playback function, a file search function, and an image collection function in correspondence to an event type.

If the occurred event relates to communication channel establishment, the electronic device 100 performs the ACLR measurement of the current channel based on feedback information obtained from the coupler 120 in operation 205. Alternatively, the electronic device 100 detects the amplitude value of an outputted signal based on feedback information.

In operation 207, the electronic device 100 checks whether the measured ACLR satisfies a set condition. For example, the electronic device 100 checks whether the measured ACLR is greater than a specified ACLR. Alternatively, the electronic device 100 checks whether the amplitude value of the measured ACLR is greater than the amplitude value of a specified ACLR.

When the measured ACLR satisfies the set condition (such as the measured ACLR is greater than the specified ACLR), the electronic device 100 adjusts an amplifier current in operation 209. During this operation, the electronic device 100 adjusts (such as reduce) the bias current of an amplifier in correspondence to a deviation between the measured ACLR and the specified ACLR. According to various embodiments of the present disclosure, the electronic device 100 adjusts the bias voltage of the amplifier in correspondence to the deviation. When the measured ACLR does not satisfy the set condition (such as the measured ACLR is less than the specified ACLR), the electronic device 100 skips operation 209.

Figure 3:
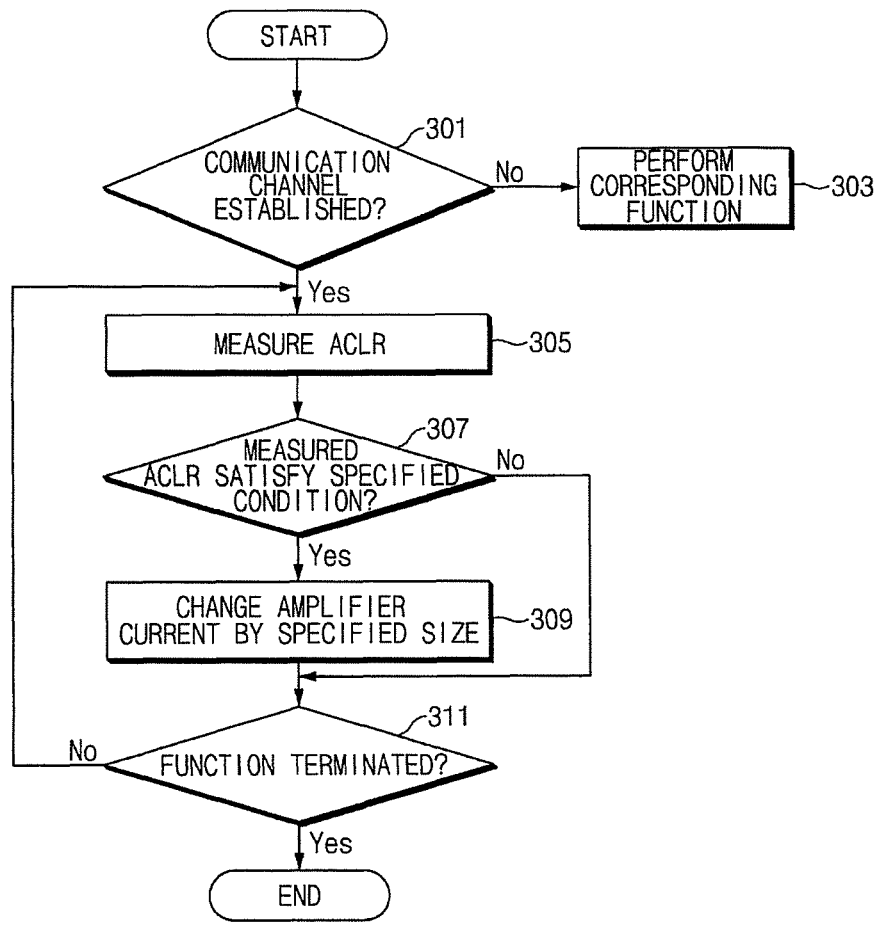
FIG. 3 illustrates an example flowchart of a step-by-step current adjustment method for an electronic device according to various embodiments of the present disclosure.

FIG. 3 illustrates an example flowchart of a step-by-step current adjustment method for an electronic device according to various embodiments of the present disclosure.

As illustrated in FIG. 3, in relation to an electronic device operating method, the electronic device 100 checks whether an event relating to communication channel establishment occurs in operation 301. If an unrelated event occurs, the electronic device 100 processes a function performance corresponding to an event type in operation 303. If an event relating to communication channel establishment occurs, the electronic device 100 measures an ACLR in operation 305 and checks whether the measured ACLR satisfies a set condition in operation 307.

If the measured ACLR satisfies the set condition, the electronic device 100 changes an amplifier current in correspondence to a specified size in operation 309. For example, when the measured ACLR is greater than the specified ACLR, the electronic device 100 detects a deviation value. According to an embodiment of the present disclosure, the electronic device 100 detects an amplitude value difference between the amplitude value of the measured ACLR and the amplitude value of the specified ACLR. Then, the electronic device 100 differently applies the size of an amplifier current value to be adjusted corresponding to the difference value. Alternatively, when the measured ACLR is greater than the specified ACLR, the electronic device 100 performs an adjustment to reduce an amplifier current by a specified size. Then, in operation 311, the electronic device 100 checks whether there is an event occurrence relating to a function termination. If there is no function termination related event, the electronic device 100 branches into operation 305 and perform subsequent operations again.

In correspondence to the aforementioned operation performance, the electronic device 100 supplies the bias current of the amplifier 130 having a size that satisfies a set condition by repeatedly adjusting the bias current of the amplifier 130 by a specified size. For example, after performing the amplifier current adjustment by a specified size, the electronic device 100 performs a size comparison between a newly measured ACLR and a specified ACLR. Then, when the measured ACLR is greater than the specified ACLR, the electronic device 100 re-performs an amplifier current adjustment by a specified size. According to various embodiments of the present disclosure, when the deviation between the measured ACLR and the specified ACLR is within a predetermined range, the electronic device 100 stops the amplifier current adjustment.

According to various embodiments of the present disclosure, the electronic device 100 performs a current adjustment by a predetermined size and performs an adaptive current adjustment corresponding to a situation. During this operation, when the measured ACLR is greater than the specified ACLR, the electronic device 100 adjusts (for example, reduce) the bias current of an amplifier by a 10 mA unit. If the deviation between the measured ACLR and the specified ACLR is within a predetermined range, the electronic device 100 differently adjusts a current size (for example, 5 mA, 2 mA, 1 mA, and so on).

Alternately, according to various embodiments of the present disclosure, when the measured ACLR is greater than the specified ACLR, the electronic device 100 adjusts the current size to at least one specified predetermined size of a large unit value (for example, 50 mA, 30 mA, 10 mA, and so on). While controlling current by using at least one of a predetermined size of large unit values, if it comes to a situation adjusted to a value similar to the specified value, the electronic device 100 adjusts the current to at least one specified small size of unit value (for example, 5 mA, 3 mA, 0.5 mA, and so on). Alternatively, according to various embodiments of the present disclosure, until an ACLR reaches a specified ACLR, the electronic device 100 adjusts current by using at least one uniform unit value or at least one non-uniform unit value.

Figure 4:
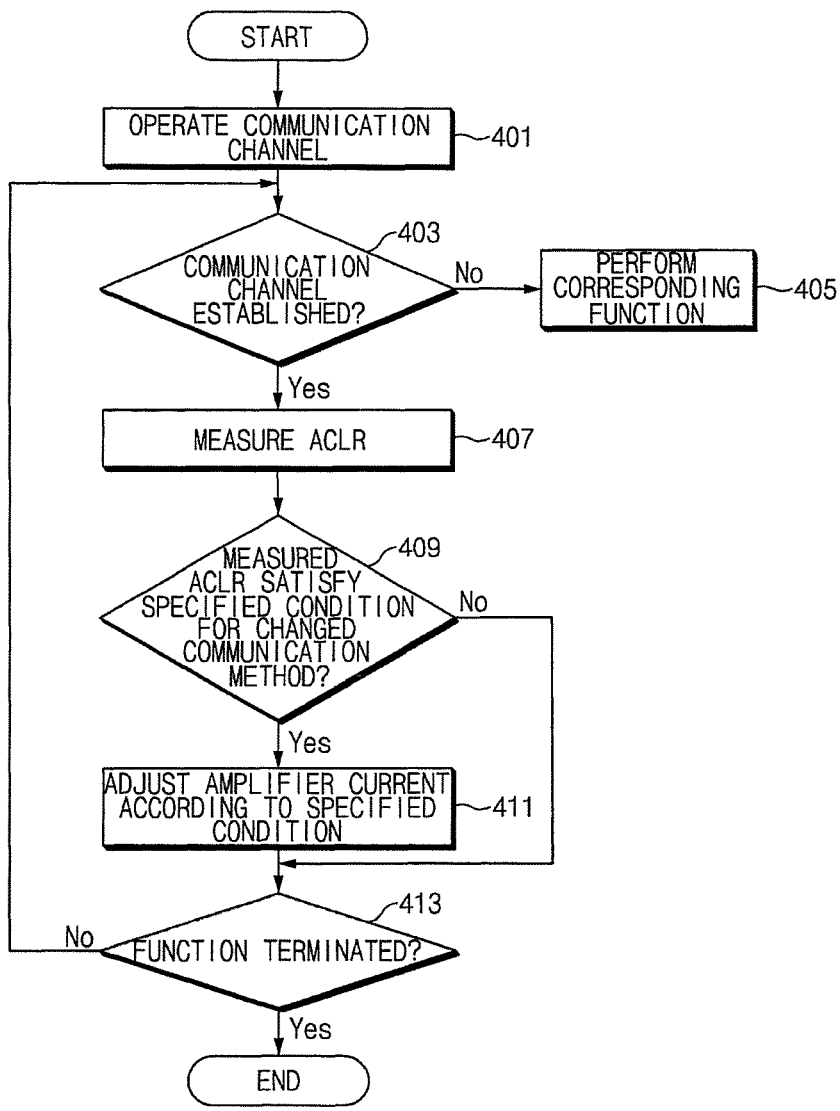
FIG. 4 illustrates an example flowchart of a specified current adjustment method of an electronic device according to various embodiments of the present disclosure.

FIG. 4 illustrates an example flowchart of a specified current adjustment method of an electronic device according to various embodiments of the present disclosure.

As illustrated in FIG. 4, the electronic device is in a communication channel operation in operation 401. In relation to this, the electronic device 100 performs a base station access in correspondence to a user input or an event occurrence relating to communication channel operation. During this operation, the electronic device 100 receives an allocated communication channel from a base station. The communication channel, for example, is various channels such as a voice call channel or a data communication channel. According to an embodiment of the present disclosure, the electronic device 100 includes a plurality of communication modules (such as communication modules having different communication methods). For example, the electronic device 100 includes a 3G network supporting communication module, a 4G network supporting communication module, and a 5G network supporting communication module. Alternatively, the electronic device 100 includes a plurality of communication modules having different transmission methods such as a time division system, a code division system, and a frequency division system.

At step 403, it is checked whether an event relating to communication method change occurs. If no communication method change related event occurs, the electronic device 100 processes a function performance relating to communication channel operation at step 405. For example, the electronic device 100 supports a voice call or a data communication based on a communication channel that is currently in operation. Alternatively, the electronic device 100 receives and outputs a streaming data through the currently operating communication channel.

If the communication method change related event occurs, the electronic device 100 performs an ACLR measurement at step 407. For example, as a voice call related event occurs during a data communication, the electronic device 100 activates a communication module, or as located within a base station communication radius supporting a communication channel based on another communication method corresponding to a base station movement, activates a communication module supporting another communication method. Additionally, the electronic device activates a communication module supporting another communication method in correspondence to a user input. When a new communication method is applied, the electronic device 100 measures an ACLR. According to various embodiments of the present disclosure, even if a communication method is not changed, when a base station change occurs and thus a communication channel changes, the electronic device 100 newly measures an ACLR.

At step 409, the electronic device 100 checks whether the measured ACLR satisfies a specified condition for a changed communication method. In relation to this, the electronic device 100 checks the specified condition for the changed communication method. The electronic device 100 includes a communication method dedicated specified condition corresponding to each communication method. For example, the electronic device 100 stores a first specified ACLR corresponding to a first communication method and a second specified ACLR corresponding to a second communication method. When a communication method changes, the electronic device 100 checks the type of a changed communication method (such as checks an operation changed communication module type) and checks a corresponding specified ACLR from a memory. The electronic device 100 compares the measured ACLR and the specified ACLR in correspondence to the changed communication method to check whether the measured ACLR is greater than a specified size.

If the measured ACLR satisfies a specified condition for a changed communication method, the electronic device 100 performs a current adjustment of the amplifier 130 corresponding to the specified condition in operation 130. When the measured ACLR does not satisfy the specified condition for the changed communication method (such as when the measured ACLR is identical to or less than the specified condition for the changed communication method), the electronic device 100 skips step 411.

At step 413, the electronic device 100 checks whether there is an event occurrence relating to a function termination. If there is no function termination related event, the electronic device 100 branches into step 403 and performs subsequent steps again.

Figure 5:
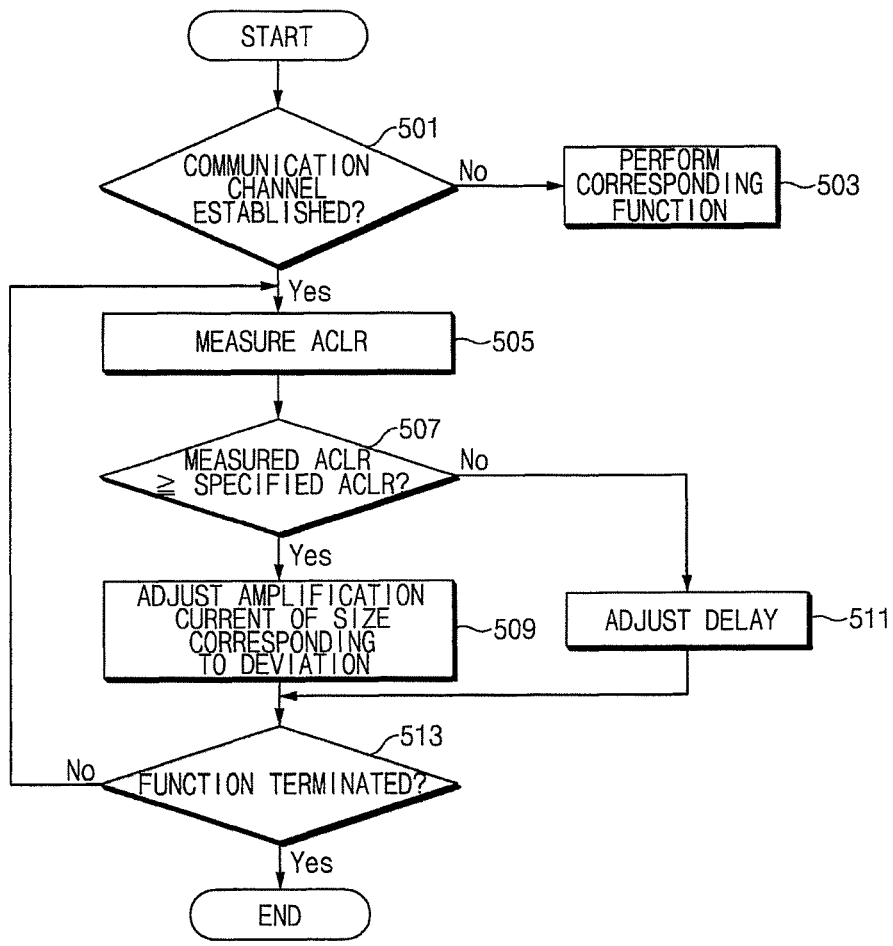
FIG. 5 illustrates an example flowchart of a delay adjustment method for an electronic device according to various embodiments of the present disclosure.

FIG. 5 illustrates an example flowchart of a delay adjustment according to various embodiments of the present disclosure.

As illustrated in FIG. 5, the electronic device 100 checks whether an event relating to communication channel establishment occurs at step 501. If an event relating to communication channel establishment does not occur, the electronic device 100 processes a function performance corresponding to an event type at step 503. If a communication channel establishment related event occurs, the electronic device 100 establishes a communication channel. During this operation, the electronic device 100 receives an allocated channel in a specific frequency band from a base station corresponding to a communication module or method specified by an event. Correspondingly, the electronic device 100 performs an ACLR measurement at step 505.

At step 507, the electronic device 100 checks whether the measured ACLR is equal or greater than a specified ACLR. If the measured ACLR is equal or greater than the specified ACLR, the electronic device 100 performs an amplifier current adjustment of a size (or an amount) corresponding to a deviation at step 509.

At step 507, if the measured ACLR is equal or greater than the specified ACLR, the electronic device 100 performs a delay adjustment at step 511. For example, the modulator 140 of the electronic device 100 processes an envelope delay by changing a parameter relating to an envelope phase change of an outputted signal in correspondence to a control of the controller 160. During this operation, the electronic device 100 performs a delay adjustment by each specified size (such as one to several times) or perform a specified number or delay processing (such as one to several times) by a size (or an amount) corresponding to a deviation between a measured ACLR and a specified ACLR.

At step 513, the electronic device 100 checks whether a function termination related event occurs. If there is no function termination related event, the electronic device 100 branches into step 505 and perform subsequent operations again.

Figure 6:
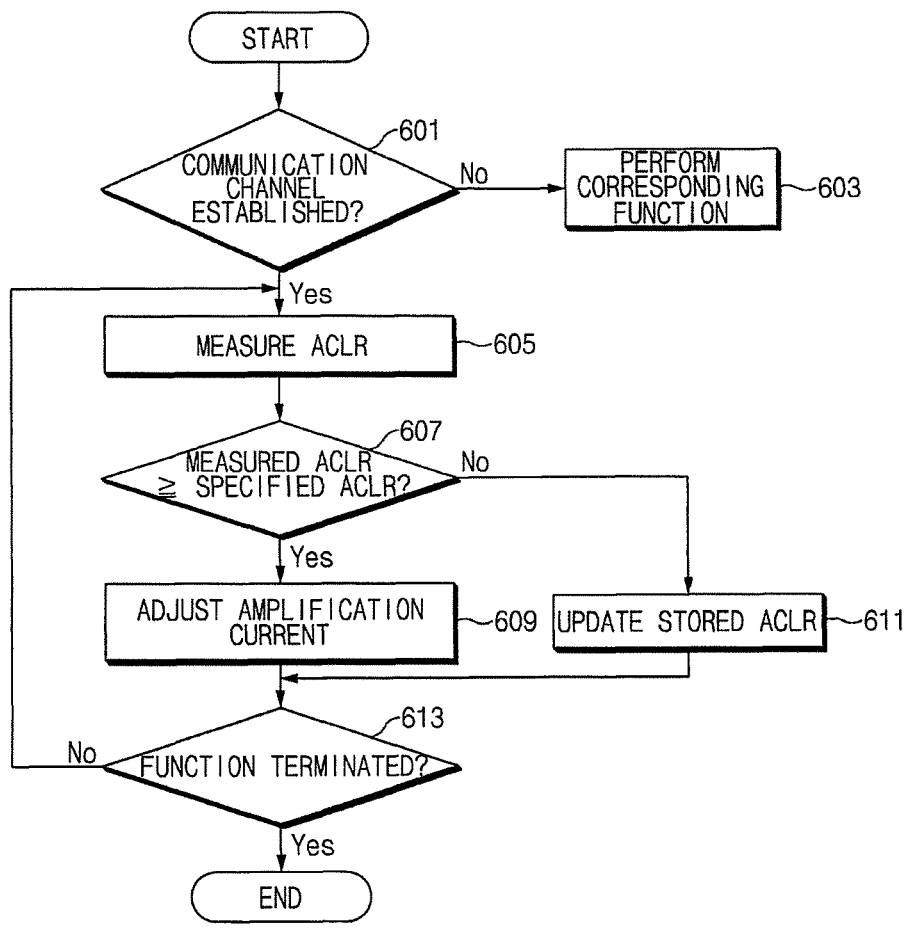
FIG. 6 illustrates an example flowchart of an ACLR updating method for an electronic device according to various embodiments of the present disclosure.

FIG. 6 illustrates an example flowchart of an ACLR updating method for an electronic device according to various embodiments of the present disclosure.

As illustrated in FIG. 6, the electronic device 100 checks whether an event relating to communication channel establishment occurs at step 601. If an event not relating to communication channel establishment occurs, the electronic device 100 processes a function performance corresponding to an event type at step 603. If the communication channel establishment related event occurs, the electronic device 100 establishes a communication channel and performs an ACLR measurement in operation 605.

In operation 607, the electronic device 100 checks whether the measured ACLR is a stored ACLR. In relation to this, the electronic device 100 checks a stored ACLR stored in a memory. If there is no ACLR in a memory, an ACLR defined by default or an initial value (such as 1) is obtained as a stored ACLR.

If the measured ACLR is equal or greater than the stored ACLR, the electronic device 100 performs an amplifier current adjustment at step 609. If the measured ACLR is less than the stored ACLR, the electronic device 100 processes a stored ACLR update at step 611. During this operation, the electronic device 100 performs a control to supply a bias current of the amplifier 130 corresponding to the measured ACLR. In aforementioned operation, if there is no previously stored ACLR, the electronic device 100 writes the currently obtained measured ACLR as a stored ACLR in a memory.

At step 613, the electronic device 100 checks whether there is a function termination related event, and if there is no function termination related event occurrence, branches into step 601 and performs subsequent operations again.

Figure 7:
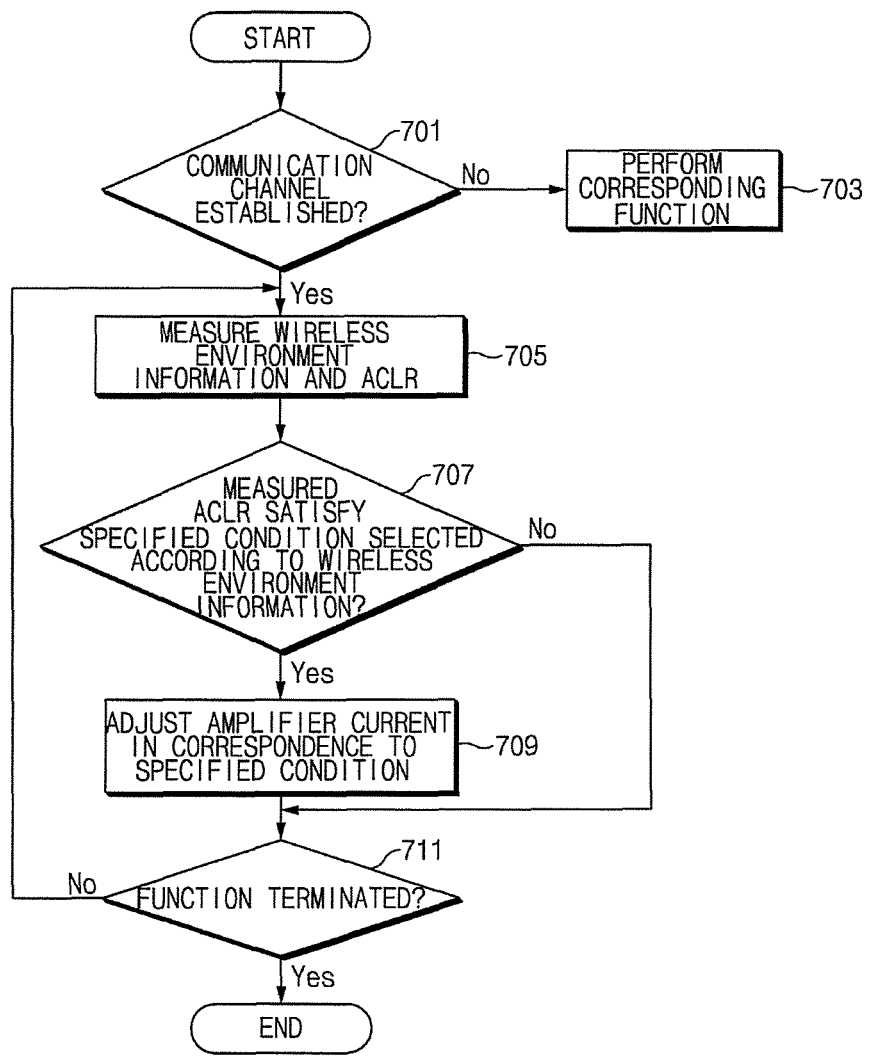
FIG. 7 illustrates an example flowchart of an operating method in a wireless environment according to various embodiments of the present disclosure.

FIG. 7 illustrates an example flowchart of an operating method in a wireless environment according to various embodiments of the present disclosure.

As illustrated in FIG. 7, the electronic device 100 checks whether an event relating to communication channel establishment occurs at step 701. If an event not relating to communication channel establishment occurs, the electronic device 100 processes a function performance corresponding to an event type at step 703.

If a communication channel establishment related event occurs, the electronic device 100 establishes a communication channel corresponding to the event. At step 705, the electronic device 100 performs wireless environment information collection and ACLR measurement. According to various embodiments of the present disclosure, the electronic device 100 measures the wireless signal reception sensitivity of a signal transmitted from a base station. Alternatively, the electronic device 100 obtains a parameter relating to wireless environment information of the current communication channel through system information provided by a base station. In relation to ACLR measurement, the electronic device 100 performs the ACLR measurement of the current channel by analyzing (such as amplitude-analyzing) a signal fed back from the coupler 120.

At step 707, the electronic device 100 checks whether the measured ACLR satisfies a specified condition selected corresponding to a wireless environment. In relation to this, the electronic device 100 includes at least one specified condition according to a wireless environment. For example, the electronic device 100 stores and manages a specified ACLR in a strong electric field environment and a specified ACLR in a weak electric field environment. The electronic device 100 checks the wireless environment information collected at step 605 and obtains a specified ACLR (such as a strong electric field corresponding ACLR or a weak electric field corresponding ACLR) corresponding thereto. The electronic device 100 checks whether a difference occurs or what degree of a difference occurs by comparing the obtained specified ACLR and the measurement ACLR.

When the specific condition is satisfied (such as the measured ACLR is greater than the specified ACLR selected in correspondence to the current wireless environment), the electronic device 100 adjusts an amplifier current in correspondence to the specified condition at step 709. For example, the electronic device 100 reduces amplifier current. In relation to a reduction method, the electronic device 100, as aforementioned, gradually reduces the amplifier current to a specified size or after reducing the amplifier current to a predetermined size, gradually reduces a current size uniformly or non-uniformly.

If the specified condition is not satisfied, the electronic device 100 skips step 709. At step 711, the electronic device 100 checks whether there is an event occurrence relating to a function termination. If there is no function termination related event, the electronic device 100 branches into step 705 and performs subsequent operations again.

According to various embodiments of the present disclosure, an electronic device operating method, for example, a communication power operating method, includes: establishing a communication channel; and when a measured adjacent channel leakage ratio (ACLR) in correspondence to the communication channel satisfies a specified condition, adjusting a size of an amplification current.

According to various embodiments of the present disclosure, the adjusting of the size of the amplification current includes: coupling an output signal of an amplifier adjusted in correspondence to an output of a radio frequency (RF) controller and an output of a modulator; and detecting the measured ACLR based on the coupled signal.

According to various embodiments of the present disclosure, the adjusting of the size of the amplification current includes: comparing a difference between the measured ACLR and a specified ACLR; comparing a difference between an amplitude of the measured ACLR and an amplitude of the specified ACLR; and storing a minimum ACLR among measured ACLRs as the specified ACLR.

According to various embodiments of the present disclosure, the method further includes storing a minimum ACLR among entire channels accessible through a communication interface establishing the communication channel as the specified ACLR.

According to various embodiments of the present disclosure, the adjusting of the size of the amplification current includes, after reducing an ACLR by a specified size, repeatedly reducing the size of the amplification current by the specified size based on a newly measured ACLR.

According to various embodiments of the present disclosure, the adjusting of the size of the amplification current further includes reducing the size of the amplification current corresponding to a difference between the measured ACLR and a specified ACLR.

According to various embodiments of the present disclosure, the method further includes, when the measured ACLR is less than a specified ACLR, processing an envelope delay.

According to various embodiments of the present disclosure, the adjusting of the size of the amplification current includes: obtaining wireless environment information in the communication channel; and adjusting the size of the amplification current based on a difference between a selected ACLR in correspondence to the obtained wireless environment information and the measured ACLR.

According to various embodiments of the present disclosure, the adjusting of the size of the amplification current includes: checking whether a base station establishing the communication channel or a communication method is changed; measuring an ACLR in correspondence to a changed channel in relation to the base station change or the communication method change; and adjusting the size of the amplification current based on a difference between a measured ACLR obtained in correspondence to the changed channel and a specified ACLR.

Figure 8:
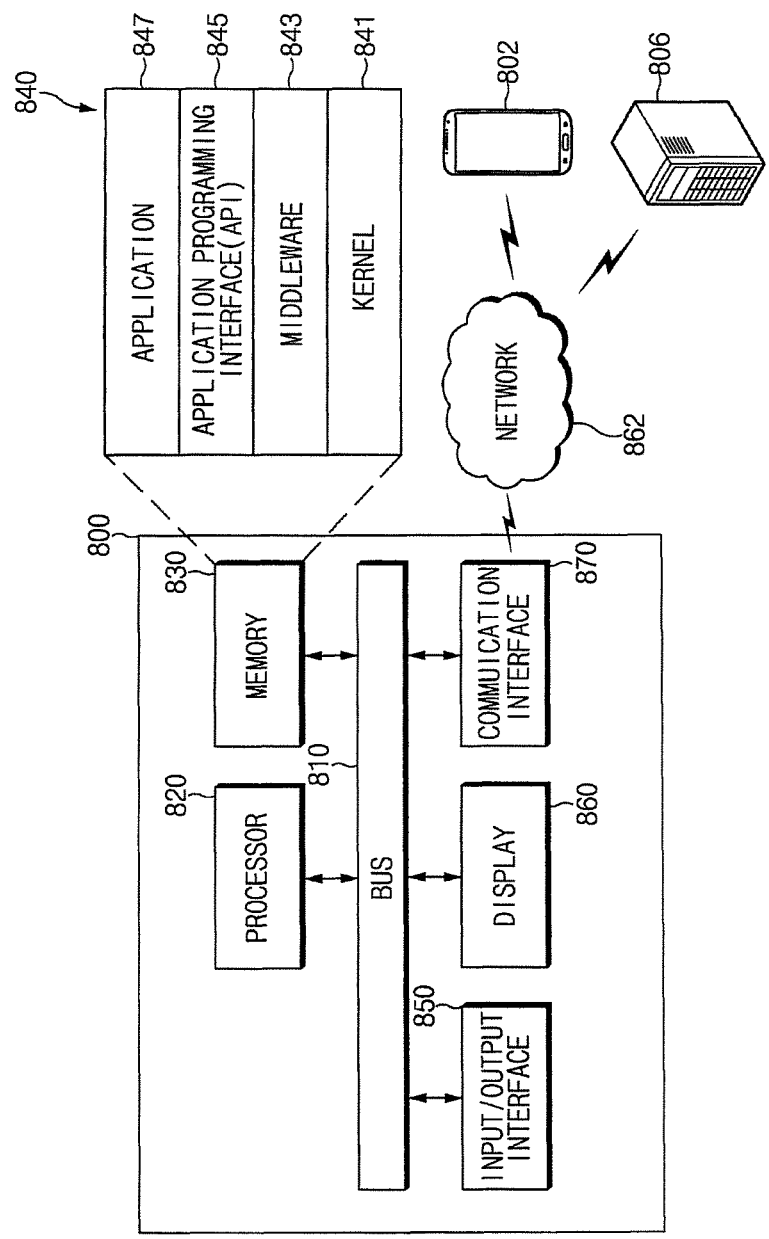
FIG. 8 illustrates an example block diagram of an electronic device in a network environment according to various embodiments of the present disclosure.

FIG. 8 illustrates an example block diagram of an electronic device 800 in a network environment according to various embodiments of the present disclosure.

As illustrated in FIG. 8, the electronic device 800 includes a bus 810, a processor 820, a memory 830, an input/output interface 850, a display 860, and a communication interface 870. According to an embodiment of the present disclosure, the electronic device 800 omits at least one of the components or additionally includes a different component.

The bus 810, for example, includes a circuit for connecting the components 820 to 870 to each other and delivering a communication (such as control message and/or data) therebetween.

The processor 820 (such as the processor 160 of FIG. 1) includes at least one of a central processing unit (CPU), an application processor (AP), and a communication processor (CP). The processor 820, for example, executes calculation or data processing for control and/or communication of at least one another component of the electronic device 800.

The memory 830 includes volatile and/or nonvolatile memory. The memory 830, for example, stores instructions or data relating to at least one another component of the electronic device 800.

According to an embodiment of the present disclosure, the memory 830 stores software and/or program 840. The programs 840 includes a kernel 841, a middleware 843, an application programming interface (API) 845, and/or an application program (or an application) 847. At least part of the kernel 841, the middleware 843, or the API 845 is called an operating system (OS).

The kernel 841, for example, controls or manages system resources (such as the bus 810, the processor 820, the memory 830, and so on) used for performing operations or functions implemented in other programs (such as the middleware 843, the API 845, or the application program 847). Additionally, the kernel 841 provides an interface for controlling or managing system resources by accessing an individual component of the electronic device 800 from the middleware 843, the API 845, or the application program 847. According to various embodiments of the present disclosure, the kernel 841 provides an interface for control and management of system resources necessary for establishing a communication channel with the electronic device 802.

The middleware 843, for example, serves as an intermediary role for exchanging data as the API 845 or the application program 847 communicates with the kernel 841. Additionally, the middleware 843 processes at least one job request received from the application program 847 corresponding to a priority. For example, the middleware 843 assigns to at least one application program 847 a priority for using a system resource (such as the bus 810, the processor 820, or the memory 830) of the electronic device 800. For example, the middleware 843 performs scheduling or load balancing on the at least one job request by processing the at least one job request corresponding to the priority assigned to the at least one job request.

The API 845, as an interface for allowing the application program 847 to control a function provided from the kernel 81 or the middleware 843, includes at least one interface or function (such as an instruction) for file control, window control, image processing, or character control.

The input/output interface 850, for example, serves as an interface for delivering instructions or data inputted from a user or another external device to another component(s) of the electronic device 800. Additionally, the input/output interface 850 outputs instructions or data received from another component(s) of the electronic device 800 to a user or another external device.

The display 860, for example, includes a liquid crystal display (LCD), a light emitting diode (LED) display, an organic light emitting diode (OLED) display, a microelectromechanical systems (MEMS) display, or an electronic paper display. The display 860 displays various contents (such as text, image, video, icon, symbol, and so on) to a user. The display 860 includes a touch screen, and for example, receives a touch, gesture, proximity, or hovering input by using an electronic pen or a user's body part.

The communication interface 870, for example, sets communication between the electronic device 800 and an external device (such as the external electronic device 802 or the server device 806). For example, the communication interface 870 communicates with an external device (such as the external electronic device 802 or the server device 806) in connection to the network 862 through wireless communication or wired communication.

The wireless communication uses at least one of long-term evolution (LTE), LTE-Advanced (LTE-A), code division multiple access (CDMA), wideband CDMA (WCDMA), universal mobile telecommunication system (UMTS), wireless broadband (WiBro), or global system for mobile communications (GSM) as a cellular communication protocol, for example. Additionally, the wireless communication, for example, includes at least one of WiFi, Bluetooth, near field communication (NFC), global positioning system (GPS), BLE, Near Field Magnetic Induction (NFMI), 2.4 G/4 GHz Ear to Ear (e2e) wireless communication methods. The wired communication, for example, may include at least one of universal serial bus (USB), high definition multimedia interface (HDMI), recommended standard 232 (RS-232), and plain old telephone service (POTS). The network 862 may include telecommunications network, for example, at least one of computer network (such as LAN or WAN), internet, and telephone network.

The external electronic device 802 is the same or different type of the electronic device 800. The server device 806 includes a group of one or more servers. According to various embodiments of the present disclosure, all or part of operations executed on the electronic device 800 are executed on another one or more electronic devices (such as the electronic device 802 or the server device 806). According to an embodiment of the present disclosure, when the electronic device 800 performs a certain function or service automatically or by a request, the electronic device 800 requests at least part of a function relating thereto from another device (such as the electronic device 802 or the server device 806) instead of or in addition to executing the function or service by itself. The other electronic devices (such as the electronic device 802 or the server device 806) executes the requested function or an additional function and may deliver an execution result to the electronic device 800. The electronic device 800 provides the requested function or service as it is or by processing the received result additionally. For this, for example, cloud computing, distributed computing, or client-server computing technology may be used.

Figure 9:
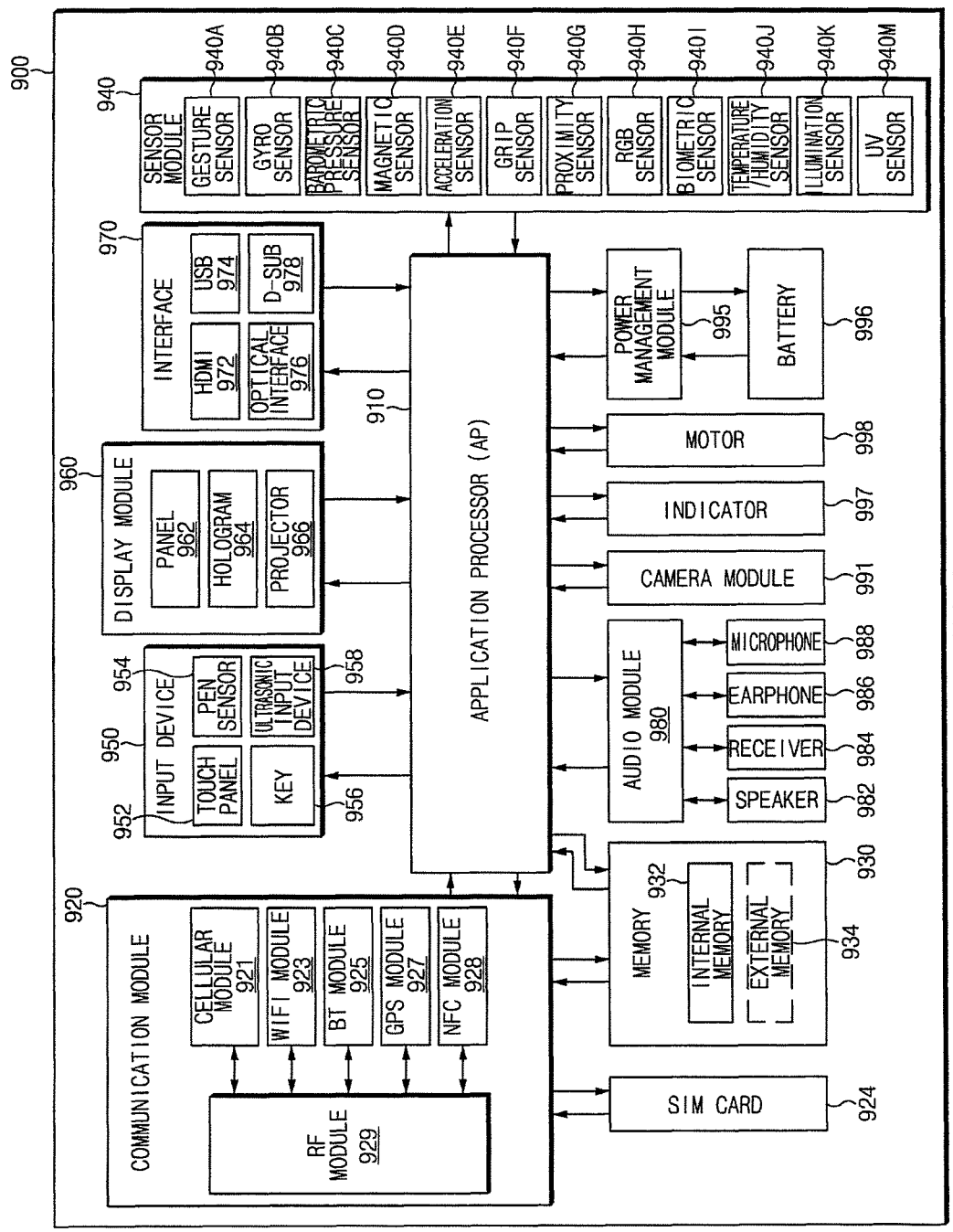
FIG. 9 illustrates another example block diagram of an electronic device according to various embodiments of the present disclosure.

FIG. 9 illustrates another example block diagram of an electronic device according to various embodiments of the present disclosure.

As illustrated in FIG. 9, the electronic device 900, for example, includes all or part of at least one of the first electronic device 100 illustrated in FIG. 1 and the electronic device 800 illustrated in FIG. 8. The electronic device 900 includes at least one processor (such as an application processor (AP) 910), a communication module 920, a subscriber identification module (SIM) 924, a memory 930, a sensor module 940, an input device 950, a display 960, an interface 970, an audio module 980, a camera module 991, a power management module 995, a battery 996, an indicator 997, and a motor 998.

The processor 910 controls a plurality of hardware or software components connected thereto and also performs various data processing and operations by executing an operating system or an application program. The processor 910 is implemented with a system on chip (SoC), for example. According to an embodiment of the present disclosure, the processor 910 further includes a graphic processing unit (GPU) (not shown) and/or an image signal processor. The processor 910 includes at least part (such as the cellular module 921) of components illustrated in FIG. 9. The processor 910 loads commands or data received from at least one of other components (such as nonvolatile memory) and process them and may store various data in a nonvolatile memory.

The communication module 920 has the same or similar configuration to the communication interface 870 illustrated in FIG. 8. The communication module 920, for example, includes a cellular module 921, a Wi-Fi module 923, a Bluetooth module 925, a GPS module 927, an NFC module 928, a radio frequency (RF) module 929, a BLE module, an NFMI module, and an E2E Wireless module (not shown).

The cellular module 921, for example, provides a voice call, a video call, a text service, or an internet service through communication network. According to an embodiment of the present disclosure, the cellular module 921 performs a distinction and authentication operation on the electronic device 900 in a communication network by using a SIM (such as a SIM card) 924. According to an embodiment of the present disclosure, the cellular module 921 performs at least part of a function that the processor 910 provides. According to an embodiment of the present disclosure, the cellular module 921 further includes a communication processor (CP).

Each of the WiFi module 923, the BT module 925, the GPS module 927, and the NFC module 928 includes a processor for processing data transmitted/received through a corresponding module. According to an embodiment of the present disclosure, at least part (such as at least one) of the cellular module 921, the WiFi module 923, the BT module 925, the GPS module 927, and the NFC module 928 is included in one integrated chip (IC) or IC package.

The RF module 929, for example, transmits/receives communication signals (such as RF signals). The RF module 929, for example, includes a transceiver, a power amp module (PAM), a frequency filter, a low noise amplifier (LNA), or an antenna. According to another embodiment of the present disclosure, at least one of the cellular module 921, the WiFi module 923, the Bluetooth module 925, the GPS module 927, and the NFC module 928 transmits/receives RF signals through a separate RF module.

The SIM 924, for example, includes a card including a SIM and/or an embedded SIM and also includes unique identification information (such as an integrated circuit card identifier (ICCID)) or subscriber information (such as an international mobile subscriber identity (IMSI)).

The memory 930 (such as the memory 830) includes an internal memory 932 or an external memory 934. The internal memory 932 includes at least one of a volatile memory (such as dynamic RAM (DRAM), static RAM (SRAM), synchronous dynamic RAM (SDRAM)) and a non-volatile memory (such as one time programmable ROM (OTPROM), programmable ROM (PROM), erasable and programmable ROM (EPROM), electrically erasable and programmable ROM (EEPROM), mask ROM, flash ROM, flash memory (such as NAND flash memory or NOR flash memory), hard drive, or solid state drive (SSD)).

The external memory 934 further includes a flash drive, for example, a compact flash (CF), a secure digital (SD), a micro Micro-SD, a Mini-SD, an extreme digital (xD), (MultiMediaCard (MMC), or a memory stick. The external memory 934 is functionally and/or physically connected to the electronic device 900 through various interfaces.

The sensor module 940 measures physical quantities or detects an operating state of the electronic device 900, thereby converting the measured or detected information into electrical signals. The sensor module 940 includes at least one of a gesture sensor 940A, a gyro sensor 940B, a barometric pressure sensor 940C, a magnetic sensor 940D, an acceleration sensor 940E, a grip sensor 940F, a proximity sensor 940G, a color sensor 940H (such as a red, green, blue (RGB) sensor), a biometric sensor 940I, a temperature/humidity sensor 940J, an illumination sensor 940K, and an ultra violet (UV) sensor 940M. Additionally or alternatively, the sensor module 940 includes an E-nose sensor, an electromyography (EMG) sensor, an electroencephalogram (EEG) sensor, an electrocardiogram (ECG) sensor, an infrared (IR) sensor, an iris sensor, or a fingerprint sensor. The sensor module 940 further includes a control circuit for controlling at least one sensor therein. According to an embodiment of the present disclosure, the electronic device 900 further includes a processor configured to control the sensor module 940 as part of or separately from the processor 910 and thus may control the sensor module 940 while the processor 910 is in a sleep state.

The input device 950 includes a touch panel 952, a (digital) pen sensor 954, a key 956, or an ultrasonic input device 958. The touch panel 952 uses at least one of capacitive, resistive, infra-red, or ultrasonic methods, for example. Additionally, the touch panel 952 further includes a control circuit. The touch panel 952 further includes a tactile layer to provide tactile response to a user.

The (digital) pen sensor 954, for example, includes a sheet for recognition as part of a touch panel or a separate sheet for recognition. The key 956 includes a physical button, an optical key, or a keypad, for example. The ultrasonic input device 958 detects ultrasonic waves generated from an input tool through a microphone (such as the microphone 988) in order to check data corresponding to the detected ultrasonic waves.

The display 960 (such as the display 860) includes a panel 962, a hologram device 964, or a projector 966. The panel 962 has the same or similar configuration to the display 860 illustrated in FIG. 8. The panel 962 is implemented to be flexible, transparent, or wearable, for example. The panel 962 and the touch panel 952 are configured with one module. The hologram 964 shows three-dimensional images in the air by using the interference of light. The projector 966 displays an image by projecting light on a screen. The screen, for example, is placed inside or outside the electronic device 900. According to an embodiment of the present disclosure, the display 960 further includes a control circuit for controlling the panel 962, the hologram device 964, or the projector 966.

The interface 970 includes a high-definition multimedia interface (HDMI) 972, a universal serial bus (USB) 974, an optical interface 976, or a d-subminiature (sub) 978, for example. The interface 970, for example, is included in the communication interface 870 illustrated in FIG. 8. Additionally or alternatively, the interface 970 includes a mobile high-definition link (MHL) interface, a secure digital (SD) card/multi-media card (MMC) interface, or an infra-red data association (IrDA) standard interface.

The audio module 980 converts sounds into electrical signals and converts electrical signals into sounds. At least some components of the audio module 980, for example, is included in the input/output interfaces illustrated in FIG. 8. The audio module 980 processes sound information inputted/outputted through a speaker 982, a receiver 984, an earphone 986, or a microphone 988.

The camera module 991, as a device for capturing a still image and a video, includes at least one image sensor (such as a front sensor or a rear sensor), a lens (not shown), an image signal processor (ISP) (not shown), or a flash (not shown) (such as an LED or a xenon lamp).

The power management module 995 manages the power of the electronic device 900. According to an embodiment of the present disclosure, the power management module 995 includes a power management IC (PMIC), a charger IC, or a battery or fuel gauge, for example. The PMIC may have a wired and/or wireless charging method. As the wireless charging method, for example, there is a magnetic resonance method, a magnetic induction method, or an electromagnetic method. An additional circuit for wireless charging, for example, a circuit such as a coil loop, a resonant circuit, or a rectifier circuit, is added. The battery gauge measures the remaining amount of the battery 996, or a voltage, current, or temperature thereof during charging. The battery 996, for example, includes a rechargeable battery and/or a solar battery.

The indicator 997 displays a specific state of the electronic device 900 or part thereof (such as the processor 910), for example, a booting state, a message state, or a charging state. The motor 998 converts electrical signals into mechanical vibration and may generate vibration or haptic effect. Although not shown in the drawings, the electronic device 900 includes a processing device (such as a GPU) for mobile TV support. A processing device for mobile TV support processes media data corresponding to the standards such as digital multimedia broadcasting (DMB), digital video broadcasting (DVB), or mediaFLO.

Figure 10:
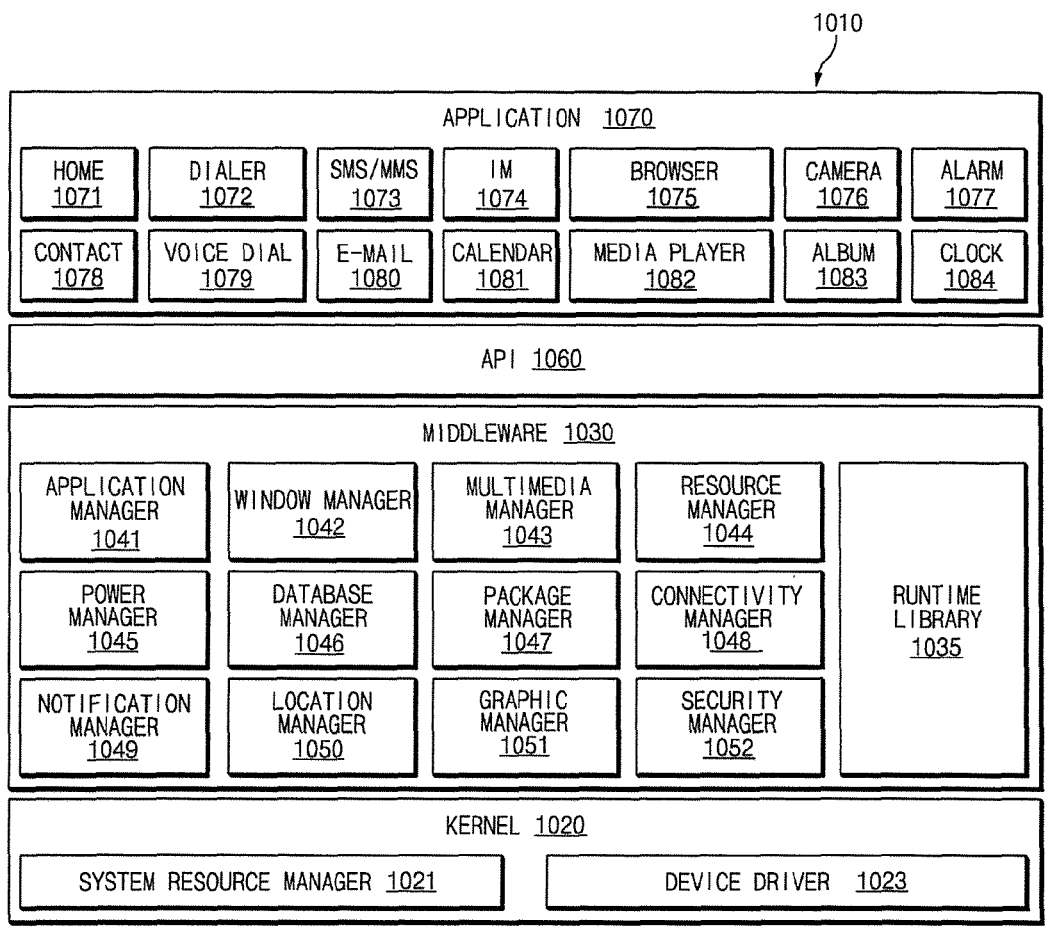
FIG. 10 illustrates an example block diagram of a program module for an electronic device according to various embodiments of the present disclosure.

FIG. 10 illustrates an example block diagram of a program module for an electronic device according to various embodiments of the present disclosure.

As illustrated in FIG. 10, the program module 1010 (such as the program 1440) includes an operating system (OS) for controlling a resource relating to an electronic device (such as the electronic devices 100, 800, and 900) and/or various applications (such as the application program 847) running on the OS. The OS, for example, includes android, iOS, windows, symbian, tizen, or bada.

The program module 1010 includes a kernel 1020, a middleware 1030, an API 1060, and/or an application 1070. At least part of the program module 1010 is preloaded on an electronic device or may be downloaded from a server (such as the electronic device 802 and the server device 806).

The kernel 1020 (such as the kernel 841), for example, includes a system resource manager 1021, or a device driver 1023. The system resource manager 1021 performs the control, allocation, or retrieval of a system resource. According to an embodiment of the disclosure, the system resource manager 1021 includes a process management unit, a memory management unit, or a file system management unit. The device driver 1023, for example, includes a display driver, a camera driver, a Bluetooth driver, a sharing memory driver, a USB driver, a keypad driver, a WiFi driver, an audio driver, or an inter-process communication (IPC) driver.

The middleware 1030, for example, provides a function that the application 1070 requires commonly, or provides various functions to the application 1070 through the API 1060 in order to allow the application 1070 to efficiently use a limited system resource inside the electronic device. According to an embodiment of the disclosure, the middleware 1030 (such as the middleware 843) includes at least one of a runtime library 1035, an application manager 1041, a window manager 1042, a multimedia manager 1043, a resource manager 1044, a power manager 1045, a database manager 1046, a package manager 1047, a connectivity manager 1048, a notification manager 1049, a location manager 1050, a graphic manager 1051, and a security manager 1052.

The runtime library 1035, for example, includes a library module that a complier uses to add a new function through a programming language while the application 1070 is running. The runtime library 1035 performs a function on input/output management, memory management, or an arithmetic function.

The application manager 1041, for example, manages the life cycle of at least one application among the applications 1070. The window manager 1042 manages a GUI resource used in a screen. The multimedia manager 1043 recognizes a format for playing various media files and encodes or decodes a media file by using the codec corresponding to a corresponding format. The resource manager 1044 manages a resource such as a source code, a memory, or a storage space of at least any one of the applications 1070.

The power manager 1045, for example, operates together with a basic input/output system (BIOS) to manage the battery or power and provides power information necessary for an operation of the electronic device. The database manager 1046 creates, searches, or modifies a database used in at least one application among the applications 1070. The package manager 1047 manages the installation or update of an application distributed in a package file format.

The connectivity manger 1048 manages a wireless connection such as WiFi or Bluetooth. The notification manager 1049 displays or notifies an event such as arrival messages, appointments, and proximity alerts to a user in a manner of not interrupting the user. The location manager 1050 manages location information on an electronic device. The graphic manager 1051 manages a graphic effect to be provided to a user or a user interface relating thereto. The security manager 1052 provides various security functions necessary for system security or user authentication. According to an embodiment, when an electronic device (for example, the electronic device 100) includes a phone function, the middleware 1030 further includes a telephony manager for managing a voice or video call function of the electronic device.

The middleware 1030 includes a middleware module for forming a combination of various functions of the above-mentioned components. The middleware 1030 provides a module specialized for each type of OS to provide differentiated functions. Additionally, the middleware 1030 deletes a part of existing components or add new components dynamically.

The API 1060 (for example, the API 845), for example, as a set of API programming functions, is provided as another configuration according to OS. For example, in the case of android or iOS, one API set is provided for each platform and in the case Tizen, at least two API sets may be provided for each platform.

The application 1070 (for example, the application program 847) includes at least one application for providing functions such as a home 1071, a dialer 1072, an SMS/MMS 1073, an instant message 1074, a browser 1075, a camera 1076, an alarm 1077, a contact 1078, a voice dial 1079, an e-mail 1080, a calendar 1081, a media player 1082, an album 1083, a clock 1084, health care (for example, measure an exercise amount or blood sugar), or environmental information provision (for example, provide air pressure, humidity, or temperature information).

According to an embodiment, the application 1070 includes an application (hereinafter referred to as "information exchange application") for supporting information exchange between the electronic device (for example, the electronic device 800) and an external electronic device (for example, the electronic device 802). The information exchange application, for example, includes a notification relay application for relaying specific information to the external device or a device management application for managing the external electronic device.

For example, the notification relay application has a function for relaying to an external electronic device (for example, electronic devices 802 and 806) notification information occurring from another application (for example, an SMS/MMS application, an e-mail application, a health care application, or an environmental information application) of the electronic device. Additionally, the notification relay application receives notification information from an external electronic device and then provides the received notification information to a user.

The device management application, for example, may manage (for example, install, delete, or update) at least one function (turn-on/turn off of the external electronic device itself (or some components) or the brightness (or resolution) adjustment of a display) of an external electronic device (for example, the electronic devices 802 and 806) communicating with the electronic device, an application operating in the external electronic device, or a service (for example, call service or message service) provided from the external device.

According to an embodiment of the disclosure, the application 1070 includes a specified application (for example, a health care application of a mobile medical device) according to the property of an external electronic device (for example, the electronic device 802). According to an embodiment, the application 1070 includes an application received from an external electronic device (for example, the server 806 or the electronic device 802). According to an embodiment of the disclosure, the application 1070 includes a preloaded application or a third party application downloadable from a server. The names of components in the program module 1010 according to the shown embodiment vary depending on the type of OS.

According to various embodiments of the present disclosure, at least part of the program module 1010 is implemented with software, firmware, hardware, or a combination thereof. At least part of the programming module 1010, for example, is implemented (for example, executed) by a processor (for example, the processor 820). At least part of the programming module 1010 includes a module, a program, a routine, sets of instructions, or a process to perform at least one function, for example.

According to the aforementioned various embodiments of the present disclosure, unnecessary energy use is suppressed by using a power level appropriate for the characteristics of an actually operating communication channel.

Each of the aforementioned components of the electronic device according to various embodiments of the present disclosure are configured with at least one component and the name of a corresponding component varies according to the kind of an electronic device. According to various embodiments of the present disclosure, an electronic device according to various embodiments of the present disclosure includes at least one of the aforementioned components, does include some of the aforementioned components, or further includes another component. Additionally, some of components in an electronic device according to various embodiments of the present disclosure are configured as one entity, so that functions of previous corresponding components are performed identically.

The term "module" used in various embodiments of the present disclosure, for example, may mean a unit including a combination of at least one of hardware, software, and firmware. The term "module" and the term "unit", "logic", "logical block", "component", or "circuit" may be interchangeably used. A "module" may be a minimum unit or part of an integrally configured component. A "module" may be a minimum unit performing at least one function or part thereof. A "module" may be implemented mechanically or electronically. For example, "module" according to various embodiments of the present disclosure may include at least one of an application-specific integrated circuit (ASIC) chip performing certain operations, field-programmable gate arrays (FPGAs), or a programmable-logic device, all of that are known or to be developed in the future.

According to various embodiments of the present disclosure, at least part of a device (for example, modules or functions thereof) or a method (for example, operations) according to this disclosure, for example, as in a form of a programming module, may be implemented using an instruction stored in computer-readable storage media. When at least one processor executes an instruction, it may perform a function corresponding to the instruction. The non-transitory computer-readable storage media may include the memory 830, for example.

The non-transitory computer-readable storage media may include hard disks, floppy disks, magnetic media (for example, magnetic tape), optical media (for example, CD-ROM, and DVD), magneto-optical media (for example, floptical disk), and hardware devices (for example, ROM, RAM, or flash memory). Additionally, a program instruction may include high-level language code executable by a computer using an interpreter in addition to machine code created by a complier. The hardware device may be configured to operate as at least one software module to perform an operation of various embodiments of the present disclosure and vice versa.

A module or a programming module according to various embodiments of the present disclosure may include at least one of the above-mentioned components, may not include some of the above-mentioned components, or may further include another component. Operations performed by a module, a programming module, or other components according to various embodiments of the present disclosure may be executed through a sequential, parallel, repetitive or heuristic method. Additionally, some operations may be executed in a different order or may be omitted. Or, other operations may be added.

According to various embodiments of the present disclosure, a computer readable recording medium may store at least one executable instruction. The at least one executable instruction may be set to perform establishing a communication channel and adjusting an amplifier current when a measured ACLR satisfies a specified condition.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device comprising:
a communication interface configured to establish a communication channel;
a controller configured to adjust a size of an amplification current associated with a signal output through the communication channel corresponding to a measured adjacent channel leakage ratio (ACLR) based on the communication channel in accordance with a difference between the measured ACLR and a specified condition;
a modulator configured to:
adjust an envelope of a signal outputted from the controller; and
adjust the size of the amplification current in accordance with a control scheme of the controller;
an amplifier configured to amplify a signal using an adjusted current value outputted from the modulator;
a coupler configured to couple a signal from the amplifier; and
a radio frequency (RF) controller configured to:
deliver the measured ACLR associated with the coupled signal from the coupler to the controller; and
output a signal in accordance with the control scheme of the controller to the amplifier.

2. The electronic device of claim 1, wherein the RF controller adjusts the size of the amplification current in accordance with a difference between the measured ACLR and a specified ACLR or a difference between an amplitude of the measured ACLR and an amplitude of the specified ACLR.

3. The electronic device of claim 1, wherein the controller stores a minimum ACLR that is one of ACLRs associated with the measured ACLRs into a memory, the minimum ACLR determining the specified ACLR.

4. The electronic device of claim 1, wherein the controller stores a minimum ACLR that is one of ACLRs associated with entire channels accessible through the communication interface, the minimum ACLR determining the specified ACLR.

5. The electronic device of claim 1, wherein the controller delivers an adjustment value of the amplification current in accordance with a difference between the measured ACLR and the specified ACLR or a difference between an amplitude of the measured ACLR and an amplitude of the specified ACLR to a modulator.

6. The electronic device of claim 1, wherein the controller processes an envelope delay when the measured ACLR is less than the specified ACLR.

7. The electronic device of claim 1, wherein the controller is further configured to:
obtain wireless environment information associated with the communication channel and
adjust the size of the amplification current in accordance with a difference between a selected ACLR associated with the obtained wireless environment information and the measured ACLR.

8. The electronic device of claim 1, wherein the controller adjusts the size of the amplification current in accordance with a difference between the measured ACLR associated with a changed communication channel that is established by a base station and the specified ACLR.

9. The electronic device of claim 1, wherein the controller measures an ACLR in correspondence to a channel allocated to a communication scheme and adjusts the size of the amplification current in accordance with a difference between the measured ACLR associated with the channel and the specified ACLR when the communication scheme is changed.

10. A method for adjusting a communication power, the method comprising:
establishing, by an electronic device, a communication channel;
when a measured adjacent channel leakage ratio (ACLR) corresponding to the communication channel satisfies a specified condition, adjusting, by the electronic device, a size of an amplification current associated with a signal output through the communication channel,
wherein adjusting the size of the amplification current further comprises:
identifying a difference between the measured ACLR and a specified ACLR; and
identifying a difference between an amplitude of the measured ACLR and an amplitude of the specified ACLR.

11. The method of claim 10, wherein adjusting the size of the amplification current comprises:
coupling an output signal of an amplifier that is adjusted in accordance with an output of a radio frequency (RF) controller and an output of a modulator; and
detecting the measured ACLR associated with the coupled output signal.

12. The method of claim 10, further comprises:
storing a minimum ACLR that is one of the measured ACLRs into a memory, wherein the minimum ACLR is determined as a specified ACLR.

13. The method of claim 10, further comprises:
storing a minimum ACLR that is one of ACLRs associated with entire channels accessible through a communication interface establishing the communication channel into a memory, wherein the minimum ACLR is determined as the specified ACLR.

14. The method of claim 10, wherein adjusting the size of the amplification current comprises repeatedly reducing the size of the amplification current by a specified size based on a newly measured ACLR.

15. The method of claim 10, wherein adjusting the size of the amplification current comprises reducing the size of the amplification current in accordance with a difference between the measured ACLR and a specified ACLR.

16. The method of claim 10, further comprises: processing an envelope delay when the measured ACLR is less than a specified ACLR.

17. The method of claim 10, wherein adjusting the size of the amplification current comprises:
obtaining wireless environment information associated with the communication channel; and
adjusting the size of the amplification current in accordance with a difference between a selected ACLR associated with the wireless environment information and the measured ACLR.

18. The method of claim 10, wherein adjusting the size of the amplification current comprises:

checking whether the communication channel or a communication scheme that is established by a base station is changed;
measuring an ACLR associated with the communication channel that has been changed by a base station or a communication scheme; and
adjusting the size of the amplification current in accordance with a difference between the measured ACLR associated with the changed communication channel and the specified ACLR.

* * * * *